United States Patent [19]
Ghazarian

[11] Patent Number: 5,469,141
[45] Date of Patent: Nov. 21, 1995

[54] OPTICAL MOTION SENSOR AND METHOD FOR OPERATING SAME

[75] Inventor: John Ghazarian, Las Vegas, Nev.

[73] Assignee: George Sellman, Murrieta, Calif.

[21] Appl. No.: 214,867

[22] Filed: Mar. 16, 1994

[51] Int. Cl.[6] ................................................. G08B 13/08
[52] U.S. Cl. ........................ 340/566; 340/429; 340/545
[58] Field of Search .................................. 340/429, 545, 340/566

[56] References Cited

U.S. PATENT DOCUMENTS

| | | | |
|---|---|---|---|
| 4,247,847 | 1/1981 | Gontowski, Jr. | 340/545 |
| 4,584,569 | 4/1986 | Lopez et al. | 340/429 |
| 4,683,753 | 8/1987 | Nelsen et al. | 340/429 |

Primary Examiner—Glen Swann
Attorney, Agent, or Firm—John J. Posta, Jr.

[57] ABSTRACT

A motion sensor for use with a security system provides an output signal to initiate an alarm whenever a significant level of movement is detected by the motion sensor. A light emitter directs light through an optical path onto a light detector, which generates an electrical output signal in response to the light directed onto it. A resiliently supported mass is coupled to the optical path to modify the optical path in response to motion imposed upon the mass, thereby reducing the transmission of light in the optical path and affecting the electrical signal as the mass moves. The motion sensor of the present invention is responsive to movement in all directions, and, since it is optical in nature, is immune to the presence of magnetic fields.

19 Claims, 4 Drawing Sheets

OPTICAL MOTION SENSOR AND METHOD FOR OPERATING SAME

BACKGROUND OF THE INVENTION

Field of the Invention

The present invention relates generally to security alarm systems, and more particularly to an improved motion sensor for detecting movement of a vehicle or other moveable object which is to be protected, with the motion sensor providing an output signal which is used to initiate an alarm whenever a significant level of movement is detected by the sensor.

Over the recent past, the rate of theft of motor vehicles has increased significantly. This is due at least in part to the simple fact that since the price of motor vehicles has increased at a significantly greater rate than the rate of inflation, the practice of stealing motor vehicles has become progressively more and more lucrative. This unfortunate occurrence has driven consumers in ever-increasing numbers to either purchase vehicles with an anti-theft system installed, or, more commonly, to have such a system installed after the purchase of a motor vehicle.

The competition between manufacturers of such anti-theft systems has led both to improvements in the design of such systems, and to a substantial drop in the cost of such systems. The most common anti-theft systems in use operate in a substantially similar manner to detect an unauthorized intrusion into the vehicle in which the anti-theft system is installed, and to sound an alarm to indicate that an attempted theft is in progress. Such alarm systems typically utilize audible alarms generated either by repetitively actuating the vehicle's horn, or by actuating a siren located in the vehicle. Many alarm-systems also flash the vehicle's lights to visually indicate that the vehicle is being subjected to an attempted theft. A few alarm systems transmit a signal to a remotely located receiver, which generates a signal to inform the owner that the vehicle has been disturbed.

Virtually all of these alarm systems operate in a substantially similar manner in order to detect an attempted theft or break-in of the vehicle. The alarm systems use switches which detect whenever a door of the vehicle (and, in many cases, whenever the hood or the trunk of the vehicle) is opened. Pin switches are typically utilized to detect entry via a door (or the opening of the hood or the trunk). Unfortunately, many thieves gain entry by breaking a window rather than by opening a locked door.

Because of this possibility, most alarm systems also include a motion detector which will initiate the alarm whenever the vehicle is moved significantly. Such motion detectors typically utilize a sensor mounted in a fixed location in the vehicle, and detect when the vehicle is subjected to a significant degree of jarring or jostling. If an intruder gets into the vehicle, the vehicle will generally be disturbed sufficiently for the motion detector to detect the disturbance and initiate an alarm. Similarly, if the vehicle is bumped or moved, the motion detector will again detect the disturbance and initiate an alarm.

Such motion detectors for the most part have been piezoelectric transducers, which have a mass suspended from an arm used to generate a bending movement of the arm when the mass is subjected to acceleration in a particular axis. A piezoelectric material is typically located on the arm, and when subjected to strain due to a bending of the arm, the piezoelectric material will generate an electrical signal. Piezoelectric transducers of this type are inexpensive, rugged, and easy to work with in the context of an alarm system. Unfortunately, since they are generally subject to movement only in a single axis more than one piezoelectric transducer is generally necessary in order to make a motion detector which will function satisfactorily for use as a motion sensor to trigger a car alarm.

As might be expected, the art has generated at least one clever alternative to the use of piezoelectric transducers as the heart of the motion detector. U.S. Pat. No. 4,584,569, to Lopez et al., reexamined as Reexamination Certificate B1 U.S. Pat. No. 4,584,569, utilizes a moveable resiliently suspended magnetic member which is coupled to a pickup coil. The magnetic member has a small but appreciable mass, and is suspended by a resilient spring member arrangement such that movement of the magnetic member causes it to move in its proximity to the pickup coil. The pickup coil is within the field of the magnetic member such that a voltage is induced in the pickup coil due to the movement of the magnetic member.

The value of the mass of the magnetic member and the relative stiffness of the resilient member are selected by Lopez et al. such that the magnetic member will be moved in significant degree in response to even very small values of motion. Movement of the magnetic member toward and away from the pickup coil, from side to side relative to the pickup coil in any direction in a plane parallel to the winding of the pickup coil, or rotationally about an axis lying in a plane parallel to the winding of the pickup coil will be detected. The suspension element is a resilient member which lies, when relaxed, in a plane parallel to the plane of the winding of the pickup coil, and substantially in the plane containing the center of gravity of the magnetic member and its mounting structure.

Signals induced in the pickup coil are amplified, and are then supplied to a comparator in order to determine whether or not the detected movement is of a sufficient level to cause an alarm to be generated. With the exception of the sensor arrangement described above, the Lopez et al. device is essentially of a conventional arrangement differing little from many other systems which generate an alarm based upon a signal from a motion detector. The Lopez et al. sensor does, however, represent a substantial improvement in the art in that it is a single sensor which is truly sensitive to motion in all directions.

Unfortunately, the Lopez et al. motion sensor is not without its disadvantages. The Lopez et al. motion sensor will work well as long as it is not subject to an appreciable magnetic field. However, if an appreciable magnetic field is generated, even for a relatively short period of time, in the viscinity of the Lopez et al. sensor, the pickup coil may have a signal generated therein which will set off the alarm. This is particularly true since due to its inherent design the Lopez et al. pickup coil must be able to detect and pick up even very small magnetic signals. Accordingly, such magnetic fields can easily generate false alarms with the Lopez et al. sensor, and, as any vehicle alarm owner knows, nothing (other than having the vehicle stolen) is more frustrating than repetitive false alarms.

It is accordingly the primary objective of the present invention that it provide a motion sensor for use with an alarm system which is responsive to movement in all directions, but which is completely immune to the presence of magnetic fields. As such, it is an objective of the motion sensor of the present invention that, when installed in a motor vehicle, it be sufficiently sensitive to motions which are indicative of a security violation of the vehicle. It is a further objective that the motion sensor of the present invention be adaptable for use in other applications than vehicle security, being usable in any application requiring a sensor for detecting movement of the item in which the sensor is located.

It is also an objective that the motion sensor of the present invention require very little power to operate, since one of its primary applications is in a motor vehicle where it will be powered by the vehicle battery, possibly for an extended period of time. It is an additional objective that the motion sensor of the present invention require electronic components which are of small size, thereby allowing the overall sensor to be relatively compact to facilitate its installation into spaces of limited size. It is a further objective of the present invention that the motion sensor design take advantage of existing, well-developed technology, thereby enabling the production of a superior motion sensor at an attractive price.

The motion sensor of the present invention must also be of construction which is both durable and long lasting, and it should also require little or no maintenance to be provided by the user throughout its operating lifetime. In order to enhance the market appeal of the motion sensor of the present invention, it should also be of inexpensive construction to thereby afford it the broadest possible market. Finally, it is also an objective that all of the aforesaid advantages and objectives of the motion sensor of the present invention be achieved without incurring any substantial relative disadvantage.

SUMMARY OF THE INVENTION

The disadvantages and limitations of the background art discussed above are overcome by the present invention. With this invention, a motion detector is based upon optical components which are normally coupled together to produce a steady state electrical output signal level proportional to the degree of optical coupling achieved. The optical path between the two optical components is sensitive to motion, and even small movements of the motion detector will cause the electrical output signal level to vary substantially. By detecting this variation in the electrical output signal level, movement of the motion detector, and thus the vehicle or article in which the motion sensor is mounted, may be detected, and an alarm signal may be initiated.

The two optical components are a light emitter and a light detector, both of which are preferably semiconductor devices. The light emitter is thus typically a light emitting diode (LED), and the light detector is either a photoresistive light detector or a photodiode. Normally, the light emitter and the light detector are mounted in a manner whereby light from the light emitter is directed onto the light detector.

A resilient suspension member is used to support a mass member in a particular orientation which, when undisturbed, will allow light to travel from the light emitter to the light detector. When the motion detector is moved in any direction, the mass member will move in opposition to the resilient support member, disturbing the light path and reducing the degree of coupling between the light emitter and the light detector. The mass member is accordingly sensitive to even small movements, and will disrupt the optical path as it moves, until the movement ceases and the mass member is returned to its original position by the resilient suspension member.

In a first embodiment, the mass member supports a reflective surface, with the light emitter being oriented to direct light onto the reflective surface on the mass member. The light detector is oriented in a fixed position to detect light supplied by the light emitter (also mounted in a fixed position) and reflected from the reflective surface of the mass member. Thus, as the mass member moves, the amount of light which is reflected toward the light detector will be affected.

In a second embodiment, one of the optical components is mounted onto the mass member. The other optical component is oriented toward the optical component mounted onto the mass member when the mass member is in its undisturbed position. When the mass member moves, the amount of light traveling from the light emitter to the light detector will be affected. Either the light emitter or the light detector may be mounted onto the mass member, with the other optical component being mounted in a fixed position relative to the mass member.

In a third embodiment, the optical components are mounted in fixed positions on opposite sides of the mass member. A thin plate having a small aperture therein is supported by the mass member near the light emitter in a position to allow light to pass therethrough to the light detector when the mass member is undisturbed. When the mass member moves, the small aperture in the plate will also move, thereby varying the amount of light passed therethrough to the light detector.

In each of the three embodiments, the electrical output signal from the light detector is coupled to an amplifier in a way eliminating the DC level of the electrical output signal. The amplified signal is low pass filtered in the preferred embodiment to remove unwanted signal elements not characteristic of movement indicative of a security violation of the vehicle. The signal may then be supplied to a comparator in order to determine whether the signal is of a sufficient level to cause the initiation of an alarm. If comparator determines that the signal is sufficient to cause the generation of an alarm, a latch will be actuated to send a signal to initiate an alarm, which may be both audible and visual, or, alternatively, either audible or visible, as is conventional.

It may therefore be seen that the present invention teaches a motion sensor for use with an alarm system which motion sensor is responsive to movement in all directions. The motion sensor of the present invention is also advantageously completely immune to the presence of magnetic fields. The motion sensor of the present invention, when installed in a motor vehicle, possesses excellent sensitivity characteristics, and thus it is capable of sensing motions which are indicative of a security violation of the vehicle. The motion sensor of the present invention is also adaptable for use in other applications than vehicle security, and is usable in virtually any application requiring a sensor for detecting movement of the item in which the sensor is located.

In addition, the motion sensor of the present invention requires very little power to operate, and may be powered by a motor vehicle battery for an extended period of time without drawing enough current to represent a substantial drain to the battery. The motion sensor of the present invention utilizes electronic components which are all of small size, thereby allowing the overall sensor to be relatively compact, and facilitating its installation into spaces of limited size. The motion sensor of the present invention also takes advantage of existing, well-developed technology, thereby enabling the production of a superior motion sensor at an attractive price.

The motion sensor of the present invention is of a construction which is both durable and long lasting, and it requires no maintenance to be provided by the user throughout its operating lifetime. The motion sensor of the present invention is also of inexpensive construction, thereby enhancing its market appeal and affording it the broadest possible market. Finally, all of the aforesaid advantages and objectives of the motion sensor of the present invention are achieved without incurring any substantial relative disadvantage.

DESCRIPTION OF THE DRAWINGS

These and other advantages of the present invention are best understood with reference to the drawings, in which.

DETAILED DESCRIPTION OF THE PREFERRED EMBODIMENT

The preferred embodiment of the present invention uses a pair of optical components which are coupled together, with a light emitter generating light which is directed through an optical path onto a light detector, which generates an electrical output signal in response to the light directed onto it. By coupling a resiliently supported mass to the optical path to modify the optical path in response to motion imposed upon the mass, the electrical signal will be affected (reduced or eliminated) as the mass moves and reduces the transmission of light in the optical path. The heart of the present invention is accordingly the two optical components, namely a light emitter and a light detector.

Figure 1:
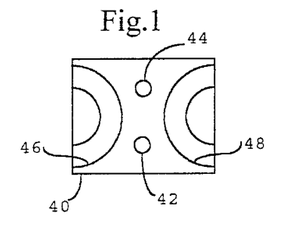
FIG. 1 is a top plan view of a mass base member.
Figure 2:
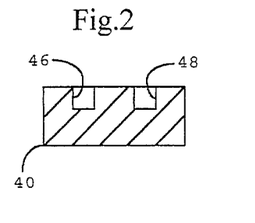
FIG. 2 is a cross-sectional view of the mass base member illustrated in FIG. 1.
Figure 3:
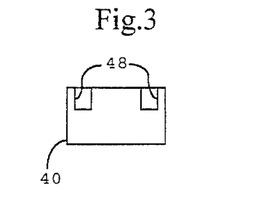
FIG. 3 is a side view of the mass base member illustrated in FIGS. 1 and 2.

Referring first to FIGS. 1 through 3, a mass base member 40 is illustrated. Located in the center of the top surface of the mass base member 40 are two spaced-apart cylindrical apertures 42 and 44, as best shown in FIG. 1. The apertures 42 and 44 will be used to mount a mass member (not illustrated in FIGS. 1 through 3) onto the top surface of the mass base member 40. Located on the right and left sides, respectively, of the mass base member 40 (as seen in FIG. 1) are two U-shaped recesses 46 and 48. Each of the U-shaped recesses 46 and 48 will be used to receive a resilient support band (not shown in FIGS. 1 through 3) therein.

Figure 4:
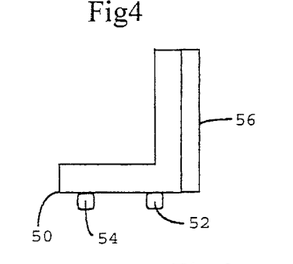
FIG. 4 is a side view of a mass member of a first embodiment which has a reflective surface mounted thereon.
Figure 5:
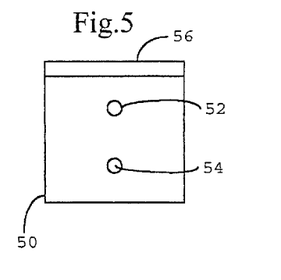
FIG. 5 is a bottom plan view of the mass member illustrated in FIG. 4.
Figure 6:
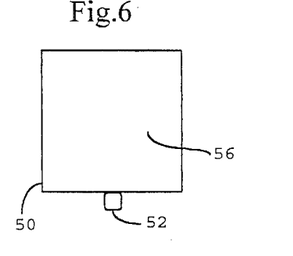
FIG. 6 is a front plan view of the mass member illustrated in FIGS. 4 and 5.

Referring next to FIGS. 4 through 6, a mass member 50 of a first embodiment is illustrated which is L-shaped in cross-section, as best illustrated in the side view of FIG. 4.

Two cylindrical pins 52 and 54 are centrally located and extend from the bottom of the lower leg of the L of the mass member 50 in spaced-apart relationship. The pins 52 and 54 are sized and spaced to fit into the apertures 42 and 44 in the top surface of the mass base member 40 (FIG. 1) in a manner such that the bottom surface of the lower leg of the L of the mass member 50 encloses the top sides of the U-shaped recesses 46 and 48 (FIG. 1) in the mass base member 40.

Located on the outer side of the top leg of the L of the mass member 50 is a reflective surface 56 which faces outwardly from the mass member 50. The reflective surface 56 is best shown in FIG. 6. The mass member 50 together with the mass base member 40 (FIGS. 1 through 3) makes up the mass which will move in response to movement of the motion sensor of the first embodiment of the present invention.

Figure 7:
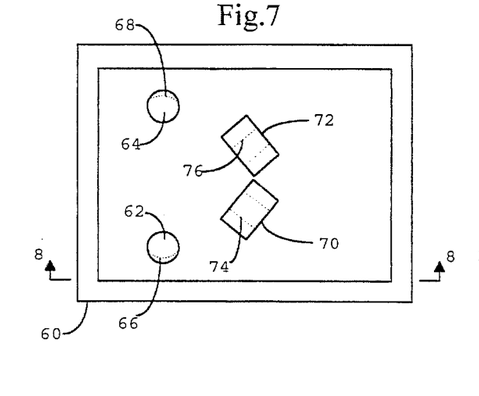
FIG. 7 is a top plan view of a housing member of a first embodiment which is open at the top side thereof.
Figure 8:
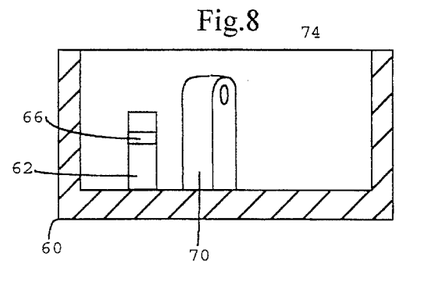
FIG. 8 is a cross-sectional view of the housing member illustrated in FIG. 7.

Referring now to FIGS. 7 and 8, a housing member 60 of a first embodiment is illustrated. The housing member 60 is open at the top side thereof to allow the assembly of various components thereinto. Extending upwardly from the bottom of the housing member 60 are two support posts 62 and 64, which are mounted near opposite sides of the housing member 60. The support posts 62 and 64 are also located relatively closer to one end of the housing member 60 (the left side as shown in FIGS. 7 and 8) than they are to the other end of the housing member 60.

Located near the top of the support post 62 on the side of the support post 62 facing away from the support post 64 is a notch 66. Similarly, located near the top of the support post 64 on the side of the support post 64 facing away from the support post 62 is a notch 68. Each of the notches 66 and 68 in the support posts 62 and 64, respectively, will be used to receive a resilient support band (not shown in FIGS. 7 and 8) therein.

Extending upwardly from the bottom of the housing member 60 are two support members 70 and 72. The support members 70 and 72 are located close together, and near the center of the housing member 60. The support member 70 has a cylindrical aperture 74 located therein near the top end thereof. Similarly, the support member 72 has a cylindrical aperture 76 located therein near the top end thereof.

The apertures 74 and 76 in the support members 70 and 72, respectively, will be used to mount optical components (not shown in FIGS. 7 and 8) therein. The ends of the apertures 74 and 76 oriented toward the support posts 62 and 64 are directed somewhat toward each other in order to facilitate transmission of light, as will become evident in conjunction with the discussion of FIGS. 9 and 10. The right side of the housing member 60 (as shown in FIGS. 7 and 8) has a location on the inside bottom surface thereof for a circuit board (not shown in FIGS. 7 and 8) to be installed.

Figure 9:
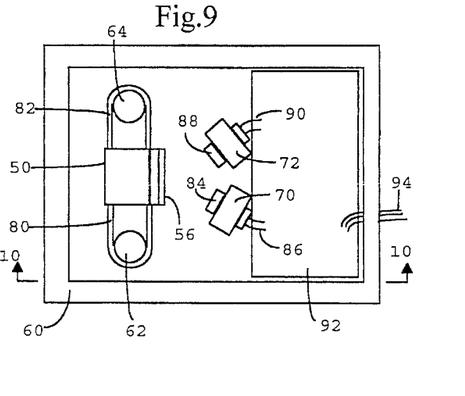
FIG. 9 is a top plan view of the housing member illustrated in FIGS. 7 and 8, showing the mass base member and the mass member, and also showing a light emitter mounted in one of the support members and a light detector mounted in the other of the support members.
Figure 10:
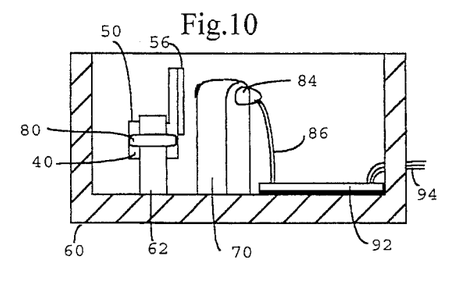
FIG. 10 is a cross-sectional view of the housing member as illustrated in FIG. 9.

Referring now to FIGS. 9 and 10, the assembly of various components into the housing member 60 is illustrated. In the discussion of this assembly, reference should also be made to FIGS. 7 and 8 in addition to FIGS. 9 and 10. Two elastomeric support bands 80 and 82 are used to support the mass, which consists of the mass base member 40 (FIGS. 1 through 3) and the mass member 50 (FIGS. 4 through 6). The elastomeric support bands 80 and 82 are both made of an elastomeric material.

One end of the elastomeric support band 80 is placed into the U-shaped recess 46 (FIG. 1) in the mass base member 40, while the other end of the elastomeric support band 80 is placed over the support post 62 into the notch 66. Similarly, one end of the elastomeric support band 82 is placed into the U-shaped recess 48 (FIG. 1) in the mass base member 40, while the other end of the elastomeric support band 82 is placed over the support post 64 into the notch 68. The mass member 50 is adhesively secured to the mass base member 40 with the pins 52 and 54 (FIG. 4) of the mass member 50 fitting into the apertures 42 and 44 (FIG. 1), respectively, of the mass base member 40.

The elastomeric support bands 80 and 82 are stretched slightly in the installation process to preload them. Note that the reflective surface 56 of the mass member 50 is oriented toward the support members 70 and 72, with the axis of the aperture 74 and the axis of the aperture 76 intersecting with an identical angular orientation with respect to the reflective surface 56 when the mass base member 40 and the mass member 50 are not being subjected to motion.

A light emitter 84 having wires 86 extending therefrom is installed into the aperture 74 in the support member 70. A light detector 88 having wires 90 extending therefrom is installed into the aperture 76 in the support member 72. Light emitted from the light emitter 84 will be reflected from the reflective surface 56 onto the light detector 88 when the mass base member 40 and the mass member 50 are not being subjected to motion. Note that the positions of the light emitter 84 and the light detector 88 could have been reversed without in any way changing the operation of the device.

Figure 11:
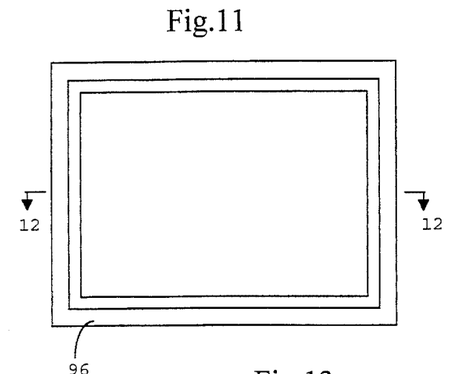
FIG. 11 is a bottom plan view of a cover which will be placed over the top of the housing member illustrated in FIGS. 7 through 10.
Figure 12:
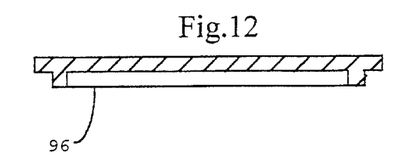
FIG. 12 is a cross-sectional view of the cover illustrated in FIG. 11.

A circuit board 92 is installed into the bottom of the housing member 60 on the right side thereof (as shown in FIGS. 9 and 10), and may be so retained through the use of adhesive. The wires 86 from the light emitter 84 and the wires 90 from the light detector 88 are electrically connected to the circuit board 92. Also, note that a plurality of wires 94 extend from the circuit board 92 through the side of the housing member 60 and out therefrom. Referring briefly to FIGS. 11 and 12, a cover 96 is illustrated which may be used to enclose the housing member 60, with the cover 96 preferably being adhesively secured to the top of the housing member 60.

Referring again to FIGS. 9 and 10, the operation of the motion sensor of the first embodiment will now be discussed. When the light emitter 84 generates light, it is reflected by the reflective surface 56 onto the light detector 88 as long as the mass base member 40 and the mass member 50 are not being subjected to motion. When the mass base member 40 and the mass member 50 are subjected to motion, the reflective surface 56 will move to adversely affect the optical path between the light emitter 84 and the light detector 88, thereby causing the electrical output signal generated by the light detector 88 to vary. This electrical output signal is accordingly indicative of movement sensed by the motion detector of the first embodiment.

Figure 13:
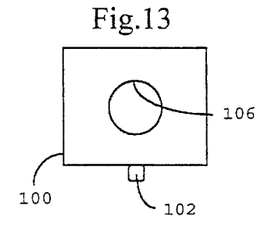
FIG. 13 is a front plan view of a mass member of a second embodiment.
Figure 14:
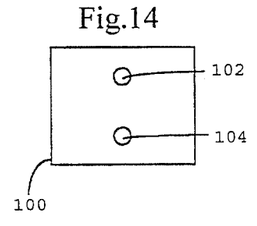
FIG. 14 is a bottom plan view of the mass member illustrated in FIG. 13.
Figure 15:
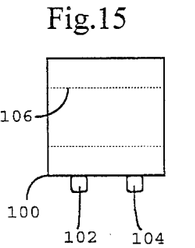
FIG. 15 is a side plan view of the mass member illustrated in FIGS. 13 and 14.

Referring next to FIGS. 13 through 15, a mass member 100 of a second embodiment is illustrated which is block-shaped in cross-section. Two cylindrical pins 102 and 104 are centrally located and extend from the bottom of the mass member 100 in spaced-apart relationship. The pins 102 and 104 are sized and spaced to fit into the apertures 42 and 44 in the top surface of the mass base member 40 (FIG. 1) in a manner such that the bottom surface of the mass member 100 encloses the top sides of the U-shaped recesses 46 and 48 (FIG. 1) in the mass base member 40.

Located in the front side of the mass member 100 is an aperture 106 which extends entirely through the mass member 100. The aperture 106 is best shown in FIG. 13. The mass member 100 together with the mass base member 40 (FIGS. 1 through 3) makes up the mass which will move in response to movement of the motion sensor of the second embodiment of the present invention.

Figure 16:
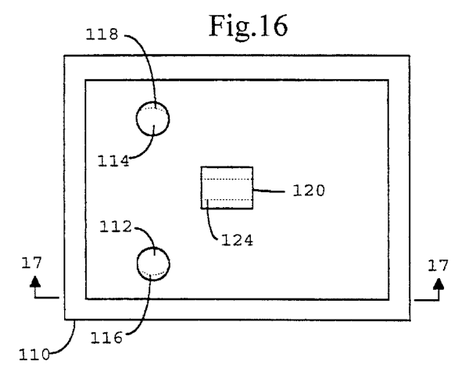
FIG. 16 is a top plan view of a housing member of a first embodiment which is open at the top side thereof.
Figure 17:
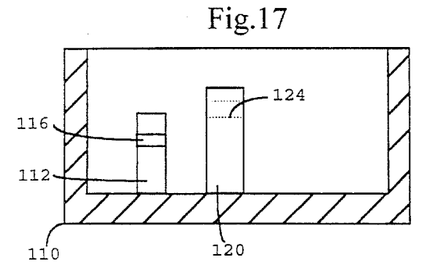
FIG. 17 is a cross-sectional view of the housing member illustrated in FIG. 16.

Referring now to FIGS. 16 and 17, a housing member 110 of a second embodiment is illustrated. The housing member 110 is open at the top side thereof to allow the assembly of various components thereinto. Extending upwardly from the bottom of the housing member 110 are two support posts 112 and 114, which are mounted near opposite sides of the housing member 110. The support posts 112 and 114 are also located relatively closer to one end of the housing member 110 (the left side as shown in FIGS. 16 and 17) than they are to the other end of the housing member 110.

Located near the top of the support post 112 on the side of the support post 112 facing away from the support post 114 is a notch 116. Similarly, located near the top of the support post 114 on the side of the support post 114 facing away from the support post 112 is a notch 118. Each of the notches 116 and 118 in the support posts 112 and 114, respectively, will be used to receive a resilient support band (not shown in FIGS. 16 and 17) therein.

Extending upwardly from the bottom of the housing member 110 is a single support member 120. The support member 120 is located near the center of the bottom of the housing member 120, and has a cylindrical aperture 124 located therein near the top end thereof. The aperture 124 will be used to mount an optical component (not shown in FIGS. 16 and 17) therein. The ends of the aperture 124 are oriented toward the ends of the housing member 110 shown on the left and right in FIGS. 16 and 17 to facilitate transmission of light, as will become evident in conjunction with the discussion of FIGS. 18 and 19. The right side of the housing member 110 (as shown in FIGS. 16 and 17) has a location on the inside bottom surface thereof for a circuit board (not shown in FIGS. 16 and 17) to be installed.

Figure 18:
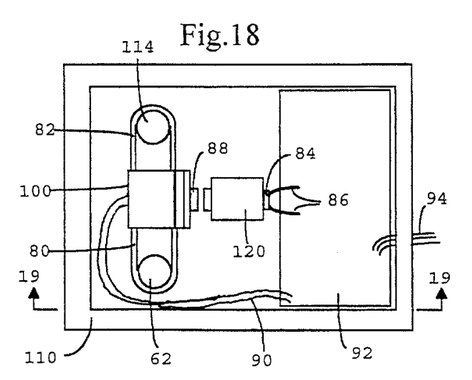
FIG. 18 is a top plan view of the housing member illustrated in FIGS. 16 and 17, showing the mass base member and the mass member, and also showing an optical component mounted in the mass member and another optical component mounted in the support member.
Figure 19:
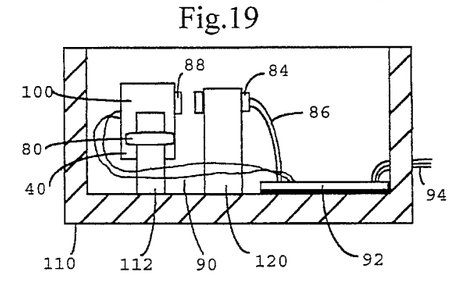
FIG. 19 is a cross-sectional view of the housing member as illustrated in FIG. 18, showing the location of one of the resilient support bands in the notch in one of the support posts.

Referring now to FIGS. 18 and 19, the assembly of various components into the housing member 110 is illustrated. In the discussion of this assembly, reference should also be made to FIGS. 16 and 17 in addition to FIGS. 18 and 19. The two elastomeric support bands 80 and 82 are used to support the mass, which consists of the mass base member 40 (FIGS. 1 through 3) and the mass member 100 (FIGS. 13 through 15).

One end of the elastomeric support band 80 is placed into the U-shaped recess 46 (FIG. 1) in the mass base member 40, while the other end of the elastomeric support band 80 is placed over the support post 112 into the notch 116. Similarly, one end of the elastomeric support band 82 is placed into the U-shaped recess 48 (FIG. 1) in the mass base member 40, while the other end of the elastomeric support band 82 is placed over the support post 114 into the notch 118. The mass member 100 is adhesively secured to the mass base member 40 with the pins 102 and 104 (FIG. 15) of the mass member 100 fitting into the apertures 42 and 44 (FIG. 1), respectively, of the mass base member 40.

The elastomeric support bands 80 and 82 are stretched slightly in the installation process to preload them. Note that the aperture 106 (FIG. 13) of the mass member 100 will be oriented coaxially with the aperture 124 when the mass base member 40 and the mass member 100 are not being subjected to motion.

The light emitter 84 is installed into the aperture 124 in the support member 120. The light detector 88 is installed into the aperture 106 (FIG. 13) in the mass member 100. Light emitted from the light emitter 84 will be directed onto the light detector 88 when the mass base member 40 and the mass member 100 are not being subjected to motion. Note that the positions of the light emitter 84 and the light detector 88 could have been reversed without in any way changing the operation of the device.

A circuit board 92 is installed into the bottom of the housing member 110 on the right side thereof (as shown in FIGS. 18 and 19), and may be so retained through the use of adhesive. The wires 86 from the light emitter 84 and the wires 90 from the light detector 88 are electrically connected to the circuit board 92. Also, note that the plurality of wires 94 extend from the circuit board 92 through the side of the housing member 110 and out therefrom. Referring briefly back to FIGS. 11 and 12, the cover 96 may be used to enclose the housing member 110, with the cover 96 preferably being adhesively secured to the top of the housing member 110.

Referring again to FIGS. 18 and 19, the operation of the motion sensor of the second embodiment will now be discussed. When the light emitter 84 generates light, it is directed onto the light detector 88 as long as the mass base member 40 and the mass member 100 are not being subjected to motion. When the mass base member 40 and the mass member 100 are subjected to motion, the light detector 88 will move to adversely affect the optical path between the light emitter 84 and the light detector 88, thereby causing the electrical output signal generated by the light detector 88 to vary. This electrical output signal is accordingly indicative of movement sensed by the motion detector of the second embodiment.

Figure 20:
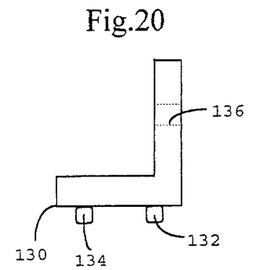
FIG. 20 is a side view of a mass member of a third embodiment which has thin plate mounted thereon, showing in phantom lines a small aperture extending through the thin plate, and also showing two cylindrical pins extending from the bottom of the mass member which will be received in the two apertures in the mass base member illustrated in FIG. 1.
Figure 21:
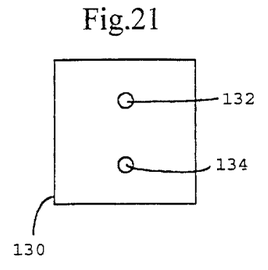
FIG. 21 is a bottom plan view of the mass member illustrated in FIG. 20, showing the two cylindrical pins extending from the bottom thereof.
Figure 22:
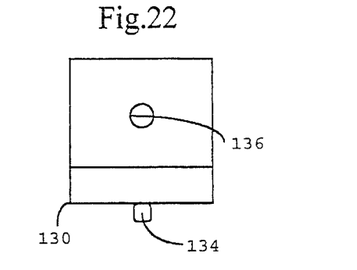
FIG. 22 is a front plan view of the mass member illustrated in FIGS. 20 and 21, showing the small aperture extending through the thin plate.

Referring now to FIGS. 20 through 22, a mass member 130 of a third embodiment is illustrated which is L-shaped in cross-section, as best illustrated in the side view of FIG. 20. Two cylindrical pins 132 and 134 are centrally located and extend from the bottom of the lower leg of the L of the mass member 130 in spaced-apart relationship. The pins 132 and 134 are sized and spaced to fit into the apertures 42 and 44 in the top surface of the mass base member 40 (FIG. 1) in a manner such that the bottom surface of the lower leg of the L of the mass member 130 encloses the top sides of the U-shaped recesses 46 and 48 (FIG. 1) in the mass base member 40.

The top leg of the L forms a thin plate, best shown in FIG. 22, which has an aperture 136 which extends therethrough. The mass member 130 together with the mass base member 40 (FIGS. 1 through 3) makes up the mass which will move in response to movement of the motion sensor of the third embodiment of the present invention.

Figure 23:
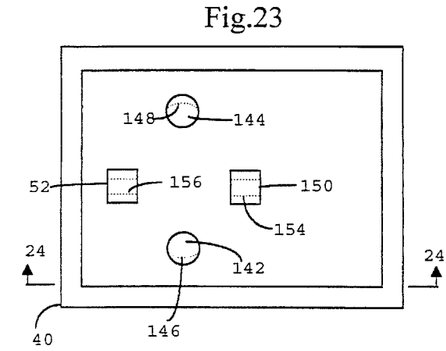
FIG. 23 is a top plan view of a housing member of a third embodiment which is open at the top side thereof.
Figure 24:
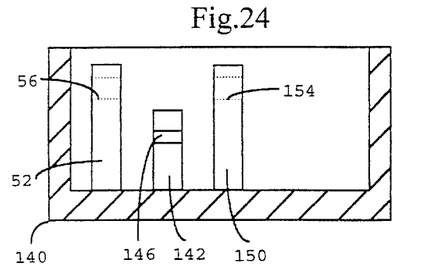
FIG. 24 is a cross-sectional view of the housing member illustrated in FIG. 23, showing the location of a notch in one of the support posts, and also showing the location of the support members.

Referring now to FIGS. 23 and 24, a housing member 140 of a third embodiment is illustrated. The housing member 140 is open at the top side thereof to allow the assembly of various components thereinto. Extending upwardly from the bottom of the housing member 140 are two support posts 142 and 144, which are mounted near opposite sides of the housing member 140. The support posts 142 and 144 are also located somewhat closer to one end of the housing member 140 (the left side as shown in FIGS. 23 and 24) than they are to the other end of the housing member 140.

Located near the top of the support post 142 on the side of the support post 142 facing away from the support post 144 is a notch 146. Similarly, located near the top of the support post 144 on the side of the support post 144 facing away from the support post 142 is a notch 148. Each of the notches 146 and 148 in the support posts 142 and 144, respectively, will be used to receive a resilient support band (not shown in FIGS. 23 and 24) therein.

Extending upwardly from the bottom of the housing member 140 are two support members 150 and 152. The support members 150 and 152 are spaced apart, and are located on either side of the center of an axis extending between the support posts 142 and 144. The support member 150 has a cylindrical aperture 154 located therein near the top end thereof. Similarly, the support member 152 has a cylindrical aperture 156 located therein near the top end thereof.

The apertures 154 and 156 in the support members 150 and 152, respectively, will be used to mount optical components (not shown in FIGS. 23 and 24) therein. The apertures 154 and 156 are coaxial with each other to facilitate transmission of light, as will become evident in conjunction with the discussion of FIGS. 25 and 26. The right side of the housing member 140 (as shown in FIGS. 23 and 24) has a location on the inside bottom surface thereof for a circuit board (not shown in FIGS. 23 and 24) to be installed.

Figure 25:
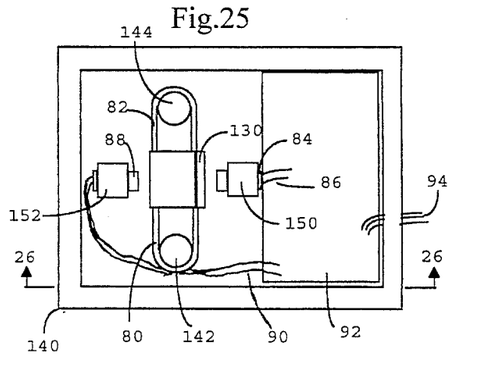
FIG. 25 is a top plan view of the housing member illustrated in FIGS. 23 and 24, showing the mass base member and the mass member, and also showing a light emitter mounted in one of the support members and a light detector mounted in the other of the support members.
Figure 26:
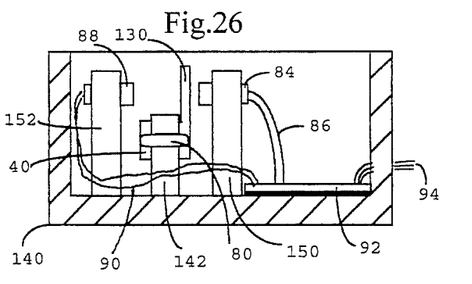
FIG. 26 is a cross-sectional view of the housing member as illustrated in FIG. 25.

Referring now to FIGS. 25 and 26, the assembly of various components into the housing member 140 is illustrated. In the discussion of this assembly, reference should also be made to FIGS. 23 and 24 in addition to FIGS. 25 and 26. The two elastomeric support bands 80 and 82 are used to support the mass, which consists of the mass base member 40 (FIGS. 1 through 3) and the mass member 130 (FIGS. 20 through 22).

One end of the elastomeric support band 80 is placed into the U-shaped recess 46 (FIG. 1) in the mass base member 40, while the other end of the elastomeric support band 80 is placed over the support post 142 into the notch 146. Similarly, one end of the elastomeric support band 82 is placed into the U-shaped recess 48 (FIG. 1) in the mass base member 40, while the other end of the elastomeric support band 82 is placed over the support post 144 into the notch 148. The mass member 130 is adhesively secured to the mass base member 40 with the pins 132 and 134 (FIG. 20) of the mass member 130 fitting into the apertures 42 and 44 (FIG. 1), respectively, of the mass base member 40.

The elastomeric support bands 80 and 82 are stretched slightly in the installation process to preload them. Note that the aperture 136 (FIG. 22) of the mass member 130 will be oriented coaxially with the aperture 154 in the support member 150 and the aperture 156 in the support member 152 when the mass base member 40 and the mass member 100 are not being subjected to motion.

The light emitter 84 is installed into the aperture 154 in the support member 150. The light detector 88 is installed into the aperture 156 in the support member 152. Light emitted from the light emitter 84 will pass cleanly through the aperture 136 (FIG. 22) in the mass member 130 and onto the light detector 88 when the mass base member 40 and the mass member 130 are not being subjected to motion. Note that the positions of the light emitter 84 and the light detector 88 could have been reversed without in any way changing the operation of the device.

A circuit board 92 is installed into the bottom of the housing member 140 on the right side thereof (as shown in FIGS. 25 and 26), and may be so retained through the use of adhesive. The wires 86 from the light emitter 84 and the wires 90 from the light detector 88 are electrically connected to the circuit board 92. Also, note that a plurality of wires 94 extend from the circuit board 92 through the side of the housing member 140 and out therefrom. Referring briefly back to FIGS. 11 and 12, the cover 96 may be used to enclose the housing member 140, with the cover 96 preferably being adhesively secured to the top of the housing member 140.

Referring again to FIGS. 25 and 26, the operation of the motion sensor of the third embodiment will now be discussed. When the light emitter 84 generates light, it passes cleanly through the aperture 136 (FIG. 22) in the mass member 130 and onto the light detector 88 as long as the mass base member 40 and the mass member 130 are not being subjected to motion. When the mass base member 40 and the mass member 130 are subjected to motion, the aperture 136 will move to adversely affect the optical path between the light emitter 84 and the light detector 88, thereby causing the electrical output signal generated by the light detector 88 to vary. This electrical output signal is accordingly indicative of movement sensed by the motion detector of the third embodiment.

Figure 27:
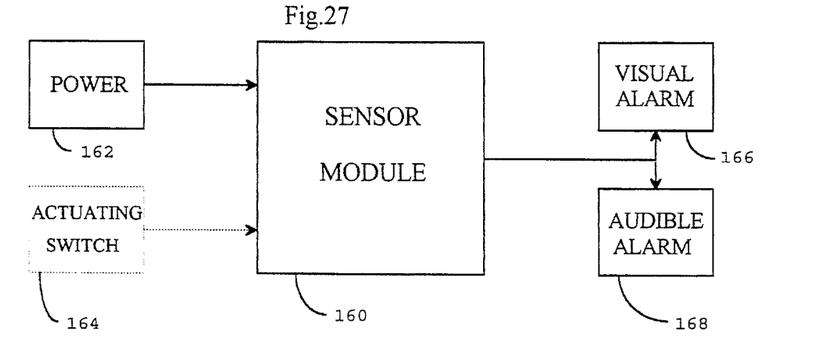
FIG. 27 is a functional schematic diagram of the interconnection between the sensor module of the present invention with a power supply, an actuating switch, and an apparatus for generating audible and visual alarms.

Referring next to FIG. 27, a simple functional schematic of an alarm system using the motion sensor of the present invention is illustrated. Any of the three embodiments of the motion sensor discussed above may be used, with the chosen motion sensor being depicted as a sensor module 160 in FIG. 27. The sensor module 160 is supplied with power from a power source 162. If desired, an actuation switch 164 may be used to actuate the operation of the sensor module 160. The utility of such an actuation switch 164 will become evident below.

The sensor module 160 is connected to provide a signal indicating that a significant motion has been detected to one or more mechanisms to provide an alarm whenever such a signal is generated. In the embodiment illustrated in FIG. 27, a visual alarm mechanism 166 and an audible alarm mechanism 168 are both utilized. Note that additional sensor modules 160 could also be connected to the same visual alarm mechanism 166 and audible alarm mechanism 168.

Figure 28:
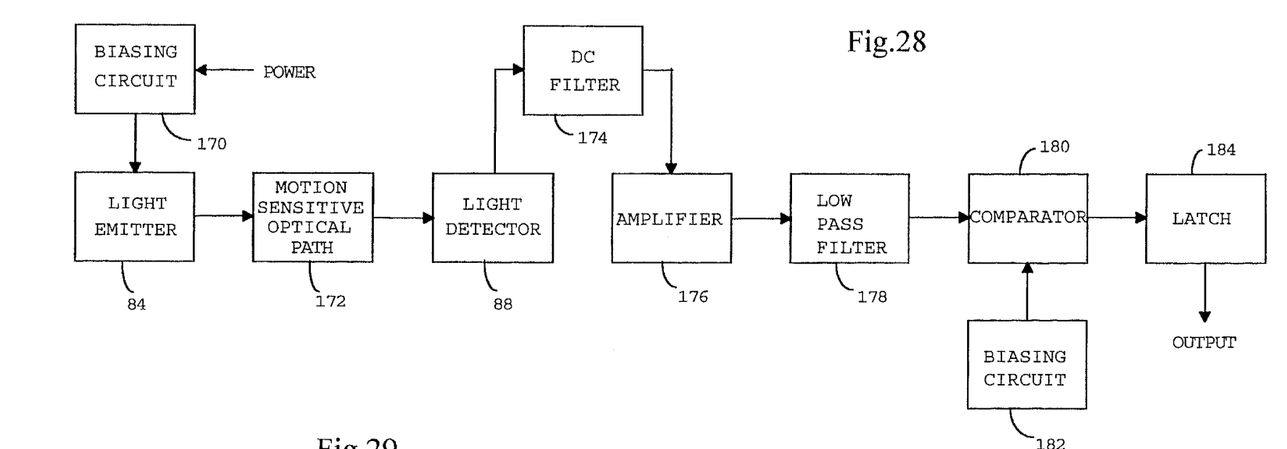
FIG. 28 is a functional schematic diagram illustrating the basic operation of the sensor module of the present invention.

Referring now to FIG. 28, the circuitry used in conjunction with the light emitter 84 and the light detector 88 is illustrated in schematic form. Power is supplied to a biasing circuit 170 which is used to power the light emitter 84 to cause it to emit light. Light emitted from the light emitter 84 is directed onto the light detector 88 through a motion sensitive optical path, which is illustrated schematically and is identified by the reference numeral 172. Note that the motion sensitive optical path 172 may be any of the three embodiments described above (FIGS. 7 through 10, FIGS. 16 through 19, or FIGS. 23 through 26).

The light detector 88 produces an electrical output signal, the level of which will vary in response to movement detected by the motion sensitive optical path 172. The electrical output signal from the light detector 88 is coupled through a DC filter 174 to an amplifier 176 in a way which effectively eliminates the DC level of the electrical output signal. Typically, this is done by capacitively coupling the electrical output signal from the light detector 88 to the amplifier 176.

The amplifier 176 thus amplifies the signal, following which the amplified signal is filtered by a low pass filter 178 to remove unwanted characteristics of the amplified signal. The filtered, amplified signal is then supplied to a comparator 180. A reference signal is supplied to the comparator 180 by a biasing circuit 182 to set a threshold. When the filtered, amplified signal exceeds the threshold, the comparator 180 will provide an output signal to a latch 184, which will in turn provide an output signal to cause an alarm to be generated until the latch 184 is reset.

Figure 29:
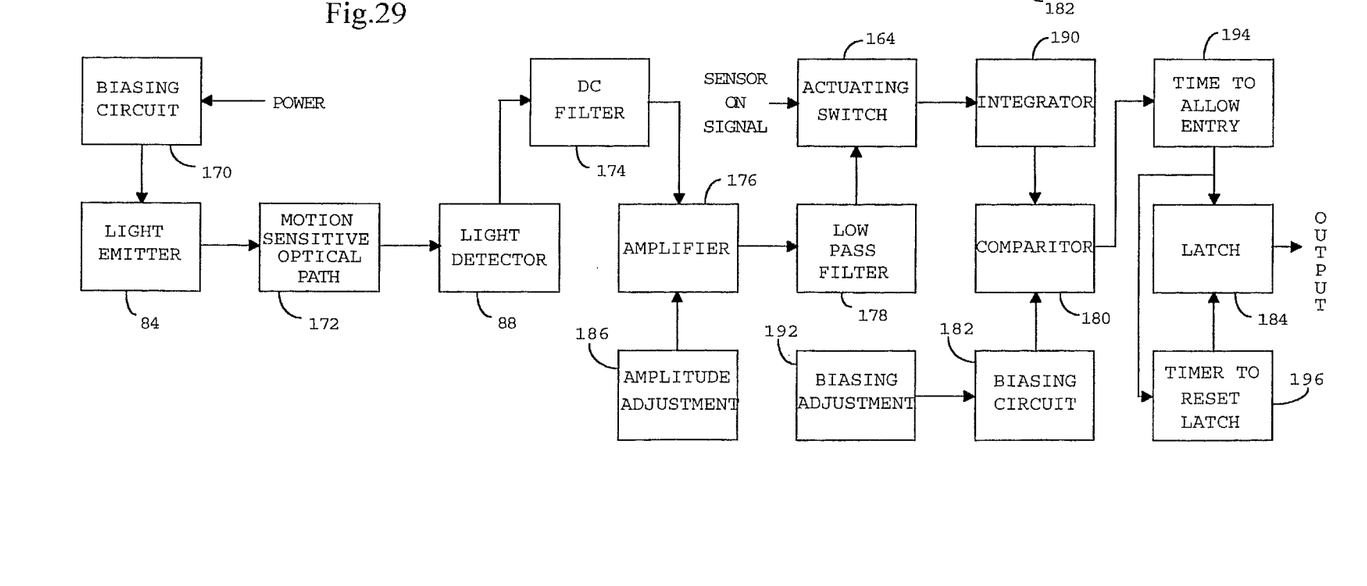
FIG. 29 is a functional schematic diagram illustrating more sophisticated operational capabilities which may optionally be added to the basic operation of the sensor module illustrated in FIG. 28.

A slightly more sophisticated circuit having several additional features is illustrated in FIG. 29. The circuit of FIG. 29 has an amplitude adjustment 186 which may be used to vary the gain of the amplifier 176. The actuation switch 164 of FIG. 27 is inserted between the amplifier 176 and the comparator 180. The actuation switch 164 is closed whenever the motion sensor is to be operating to monitor for movement. When the actuation switch 164 is open, the comparator 180 will not be fed a signal from the amplifier 176, and thus no output signal can be produced by the system.

FIG. 29 also adds an integrator 190 located between the amplifier 176 and the comparator 180, downstream of the actuation switch 164. The integrator 190 can be used to sum signals indicating movement over some moving window of time, and will enable a more sophisticated system which will tend to ignore otherwise significant but brief single signals as long as they are isolated.

Another feature added in FIG. 29 is a biasing adjustment 192, which is used to adjust the threshold value provided by the biasing circuit 182 to the comparator 180. A timer 194 is used to delay the operation of the motion sensor for a predetermined period after system actuation to allow an individual time to exit a vehicle after activating the actuation switch 164. Yet another timer 196 is used to reset the latch 184 after it has provided the output signal for a predetermined period of time. Other various embellishments are well known in the art, and could also be added to the system as described herein.

It may therefore be appreciated from the above detailed description of the preferred embodiment of the present invention that it teaches a motion sensor for use with an alarm system which motion sensor is responsive to movement in all directions. The motion sensor of the present invention is also advantageously completely immune to the presence of magnetic fields. The motion sensor of the present invention, when installed in a motor vehicle, possesses excellent sensitivity characteristics, and thus it is capable of sensing motions which are indicative of a security violation of the vehicle. The motion sensor of the present invention is also adaptable for use in other applications than vehicle security, and is usable in virtually any application requiring a sensor for detecting movement of the item in which the sensor is located.

In addition, the motion sensor of the present invention requires very little power to operate, and may be powered by a motor vehicle battery for an extended period of time without drawing enough current to represent a substantial drain to the battery. The motion sensor of the present invention utilizes electronic components which are all of small size, thereby allowing the overall sensor to be relatively compact, and facilitating its installation into spaces of limited size. The motion sensor of the present invention also takes advantage of existing, well-developed technology, thereby enabling the production of a superior motion sensor at an attractive price.

The motion sensor of the present invention is of a construction which is both durable and long lasting, and it requires no maintenance to be provided by the user throughout its operating lifetime. The motion sensor of the present invention is also of inexpensive construction, thereby enhancing its market appeal and affording it the broadest possible market. Finally, all of the aforesaid advantages and objectives of the motion sensor of the present invention are achieved without incurring any substantial relative disadvantage.

Although an exemplary embodiment of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

What is claimed is:

1. A motion sensor for use in a security system, said motion sensor comprising:

a housing member;

a mass member;

support means for resiliently supporting said mass member within said housing member, said mass member being supported by said support means in a rest position relative to said housing member when said housing member is not subject to motion, said mass member being resiliently moveable in bidirectional movement in any of three mutually orthogonal axes of movement from said rest position to any of a plurality of different positions relative to said housing member when said housing member is subjected to motion;

a light emitter, located in said housing member, for emitting light;

a light detector, located in said housing member, for detecting light and for generating an electrical output signal indicative of the light detected by said light detector; and means, located in said housing member, for defining a light path between said light emitter and said light detector when said mass member is in said rest position, said light path between said light emitter and said light detector being altered when said mass member moves from said rest position to any of said plurality of different positions, said electrical output signal varying whenever said light path between said light emitter and said light detector is altered.

2. A motion sensor as defined in claim 1, wherein said housing member comprises:

a housing which is open at a top side thereof; and a cover for enclosing said open top side of said housing.

3. A motion sensor as defined in claim 1, wherein said support means comprises:

a first support post mounted in said housing member;

a second support post mounted in said housing member and spaced away from said first support post; and resilient support means for resiliently supporting said mass member between said first and second posts.

4. A motion sensor as defined in claim 3, wherein said resilient support means comprises:

a first elastomeric support band extending between said first support post and said mass member; and a second elastomeric support band extending between said second support post and said mass member.

5. A motion sensor as defined in claim 4, additionally comprising:

a first notch located in the side of said first support post on a side of said first support post which is facing away from said second support post, said first elastomeric support band being located within said first notch; and a second notch located in the side of said second support post on a side of said second support post which is facing away from said first support post, said second elastomeric support band being located within said second notch.

6. A motion sensor as defined in claim 4, wherein said mass member comprises:

a mass base member; and a mass top member fixedly mounted on said mass base member, said mass base member and said mass top member together defining means for retaining said first and second elastomeric support bands therebetween.

7. A motion sensor as defined in claim 4, wherein said first and second elastomeric support bands define a first plane, and wherein said light emitter and said light detector are located in a second plane which is parallel to said first plane.

8. A motion sensor as defined in claim 1, wherein said light emitter comprises:

a light emitting diode (LED).

9. A motion sensor as defined in claim 1, wherein said light detector comprises:

a semiconductor device from the group consisting of a photoresistive light detector and a photodiode.

10. A motion sensor as defined in claim 1, wherein said means for defining a light path comprises:

means for fixedly mounting said light emitter and said light detector in said housing member; and light channeling means, mounted on said mass member, for allowing light from said light emitter to be directed onto said light detector when said mass member is in said rest position.

11. A motion sensor as defined in claim 10, wherein said light channeling means comprises:

a reflector member fixedly mounted on said mass member and moving with said mass member.

12. A motion sensor as defined in claim 11, wherein said reflector member is mounted on a side of said mass member, and wherein said light emitter and said light detector are mounted in said housing member in an orientation toward both said side of said mass member and said reflector member such that light from said light emitter is reflected off of said reflector member onto said light detector when said mass member is in said rest position.

13. A motion sensor as defined in claim 10, wherein said light channeling means comprises:

a plate member fixedly mounted on said mass member and moving with said mass member, said plate member having an aperture extending therethrough.

14. A motion sensor as defined in claim 13, wherein said light emitter and said light detector are mounted in said housing member on opposite sides of said plate member in an orientation whereby said aperture in said plate member is located directly between said light emitter and said light detector when said mass member is in said rest position.

15. A motion sensor as defined in claim 1, wherein said means for defining a light path comprises:

means for fixedly mounting one of said light emitter and said light detector in said housing member; and means for fixedly mounting the other one of said light emitter and said light detector on said mass member, whereby said light emitter and said light detector are relatively oriented toward each other such that light from said light emitter is directed onto said light detector when said mass member is in said rest position.

16. A motion sensor as defined in claim 1, additionally comprising:

an amplifier having said electrical output signal capacitively coupled as an input thereto, said amplifier providing an amplified signal as an output;

means for generating a threshold signal; and a comparator having said amplified signal and said threshold signal as inputs, said comparator generating a comparator output signal to initiate an alarm whenever said amplified signal exceeds said threshold signal.

17. A motion sensor as defined in claim 16, additionally comprising:

a latch having as an input said comparator output signal, said latch providing a longer time duration alarm output signal in response to receiving said comparator output signal as an input.

18. A motion sensor for use in a security system, said motion sensor comprising:

a housing member;

a mass member;

support means for resiliently supporting said mass member from said housing member in a rest position when said housing member is not subject to motion, said mass member being resiliently moveable in bidirectional movement in any of three mutually orthogonal axes of movement from said rest position to any of a plurality of different positions when said housing member is subjected to motion;

a light emitter for emitting light;

a light detector for detecting light and for generating an electrical output signal indicative of the light detected by said light detector; and means, located in said housing member, for defining a light path between said light emitter and said light detector when said mass member is in said rest position, said light path between said light emitter and said light detector being altered and said electrical output signal varying whenever said mass member moves from said rest position to any of said plurality of different positions.

19. A method of detecting motion for use in initiating an alarm when motion is detected, said method comprising:

supporting a mass member in a resilient manner within a housing member, said mass member being supported in a rest position relative to said housing member when said housing member is not subject to motion, said mass member being resiliently moveable in bidirectional movement in any of three mutually orthogonal axes of movement from said rest position to any of a plurality of different positions relative to said housing member when said housing member is subjected to motion;

emitting light from a light emitter located in said housing member;

detecting light with a light detector and generating an electrical output signal from said light detector which is indicative of the light detected by said light detector, said light detector being located in said housing member; and providing a light path between said light emitter and said light detector when said mass member is in said rest position, said light path between said light emitter and said light detector being altered when said mass member moves from said rest position to any of said plurality of different positions, said electrical output signal varying whenever said light path between said light emitter and said light detector is altered.

* * * * *